(12) United States Patent
Muthiah (10) Patent No.: US 11,343,531 B2
(45) Date of Patent: May 24, 2022

(54) STORAGE SYSTEM AND METHOD FOR OBJECT MONITORING

(71) Applicant: Western Digital Technologies, Inc., San Jose, CA (US)

(72) Inventor: Ramanathan Muthiah, Karnataka (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/903,930

(22) Filed: Jun. 17, 2020

(65) Prior Publication Data
US 2021/0400302 A1 Dec. 23, 2021

(51) Int. Cl.
| | | |
|---|---|---|
| *H04N 19/52* | (2014.01) | |
| *H04N 19/53* | (2014.01) | |
| *H04N 19/547* | (2014.01) | |
| *H04N 19/513* | (2014.01) | |
| *G08B 13/196* | (2006.01) | |
| *G06N 20/00* | (2019.01) | |

(52) U.S. Cl.
CPC .......... *H04N 19/521* (2014.11); *G06N 20/00* (2019.01); *G08B 13/19602* (2013.01); *H04N 19/53* (2014.11); *H04N 19/547* (2014.11)

(58) Field of Classification Search
None
See application file for complete search history.

(56) References Cited

U.S. PATENT DOCUMENTS

| | | | |
|---|---|---|---|
| 10,671,934 B1* | 6/2020 | Ninh | G06N 20/00 |
| 2017/0026609 A1 | 1/2017 | Okazaki | |
| 2018/0192057 A1* | 7/2018 | Ardo | H04N 19/162 |
| 2019/0130188 A1* | 5/2019 | Zhou | G06K 9/00718 |
| 2019/0230277 A1* | 7/2019 | Visa | H04N 19/172 |
| 2019/0335192 A1* | 10/2019 | Otto | G06N 20/10 |
| 2020/0099954 A1* | 3/2020 | Hemmer | H04N 19/597 |
| 2020/0143457 A1* | 5/2020 | Manmatha | G06F 16/7867 |
| 2021/0152282 A1* | 5/2021 | Huang | H04L 1/0061 |

OTHER PUBLICATIONS

"A Bit on Bit Rates"; Security Camera King blog post; downloaded from the Internet at https://www.securitycameraking.com/securityinfo/a-bit-on-bit-rates/ on Mar. 24, 2020; 9 pages.
"Understanding IP Surveillance Camera Bandwidth"; Fortinet whitepaper; May 11, 2017; 17 pages.
(Continued)

*Primary Examiner* — Samuel D Fereja
(74) *Attorney, Agent, or Firm* — Crowell & Moring LLP (57) ABSTRACT

A storage system and method for object monitoring/anticipation in surveillance systems are provided. In one embodiment, a storage system is provided comprising a memory and a controller. The controller is configured to identify positions of an object in a plurality of frames of video data provided by a video capture device; determine a rate of movement of the object based on the identified positions; and based on the determined rate of movement of the object, provide a suggestion to the video capture device to dynamically modify an encoding bit rate of the video data to improve video quality of the object. Other embodiments are provided.

18 Claims, 6 Drawing Sheets

(56) References Cited

OTHER PUBLICATIONS

"IP Cameras: Difference Between VBR and CBR Bitrate Controlling"; Unifore Security blog post; Apr. 21, 2017; downloaded from the Internet at Https://www.unifore.net/ip-video-surveillance/ip-cameras-difference-between-vbr-and-cbr-bitrate-controlling.html on Mar. 24, 2020; 7 pages.
Bottini, Daniele;"Why Do I Get a Higher Bitrate During the Night?"; Videotech technical support article; Aug. 3, 2016; downloaded from the Internet at https://support.videotec.com/hc/en-gb/articles/212800623-Why-do-I-get-a-higher-bitrate-during-the-night-, on Mar. 24, 2020; 2 pages.
U.S. Appl. No. 15/929,090, filed Jan. 11, 2019, entitled "Non-Volatile Memory System Including a Partial Decoder and Event Detector for Video Streams."

\* cited by examiner

STORAGE SYSTEM AND METHOD FOR OBJECT MONITORING

BACKGROUND

A storage system can be used to store and retrieve video data provided by a video capture device. The video capture device can be used in a surveillance environment.

DETAILED DESCRIPTION

Overview

By way of introduction, the below embodiments relate to a storage system and method for object monitoring/anticipation in surveillance systems. In one embodiment, a storage system is provided comprising a memory and a controller. The controller is configured to identify positions of an object in a plurality of frames of video data provided by a video capture device; determine a rate of movement of the object based on the identified positions; and based on the determined rate of movement of the object, provide a suggestion to the video capture device to dynamically modify an encoding bit rate of the video data to improve video quality of the object.

In some embodiments, the controller is further configured to identify positions of the object at a beginning of a capture zone.

In some embodiments, the controller is further configured to identify positions of the object during a first two frames that the image appears in the video data.

In some embodiments, the controller is further configured to identify the object using machine learning.

In some embodiments, the controller is further configured to identify a type of the object.

In some embodiments, the controller is further configured to identify the type of object using machine learning.

In some embodiments, the type of the object comprises one of the following; a human, an animal, and a vehicle.

In some embodiments, the controller is further configured to provide a suggestion to the video capture device to dynamically modify the encoding bit rate of the video data based on the type of the object.

In some embodiments, the memory comprises a three-dimensional memory.

In another embodiment, a method is provided that is performed in a storage system comprising a memory. The method comprises detecting an object in a frame of video data provided by a video capture device; performing interpolation on the detected object to determine a type of the object; and providing a suggestion to the capture device to dynamically modify an encoding bit rate of the video data based on the type of the object.

In some embodiments, the object is detected in a first instantaneous decoder refresh (IDR) frame.

In some embodiments, the object is detected using machine learning.

In some embodiments, the type of the object comprises one of the following; a human, an animal, and a vehicle.

In another embodiments, a device is provided comprising means for determining a rate of movement of an object in video data captured by a video capture unit; and means for instructing the video capture unit to dynamically modify an encoding bit rate of the video data based on the determined rate of movement of the object to improve video quality of the object.

In some embodiments, the device further comprises means for identifying the object using machine learning.

In some embodiments, the device further comprises means for identifying a type of the object.

In some embodiments, the type of the object comprises one of the following; a human, an animal, and a vehicle.

In some embodiments, the device further comprises means for instructing the video capture unit to dynamically modify encoding bit rate of the video data based on the type of the object.

In some embodiments, the device comprises a storage system.

In some embodiments, the device comprises a host configured to communicate with a storage system.

Other embodiments are possible, and each of the embodiments can be used alone or together in combination. Accordingly, various embodiments will now be described with reference to the attached drawings.

Embodiments

Figures 1A, 1B:
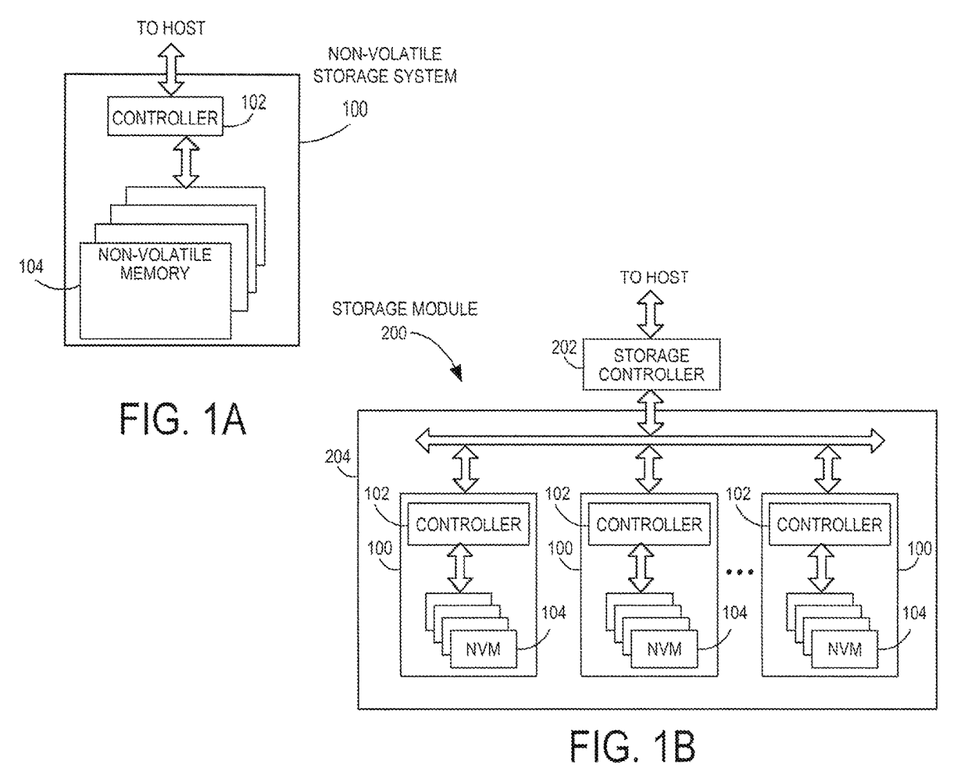
FIG. 1A is a block diagram of a non-volatile storage system of an embodiment.
FIG. 1B is a block diagram illustrating a storage module of an embodiment.
Figure 1C:
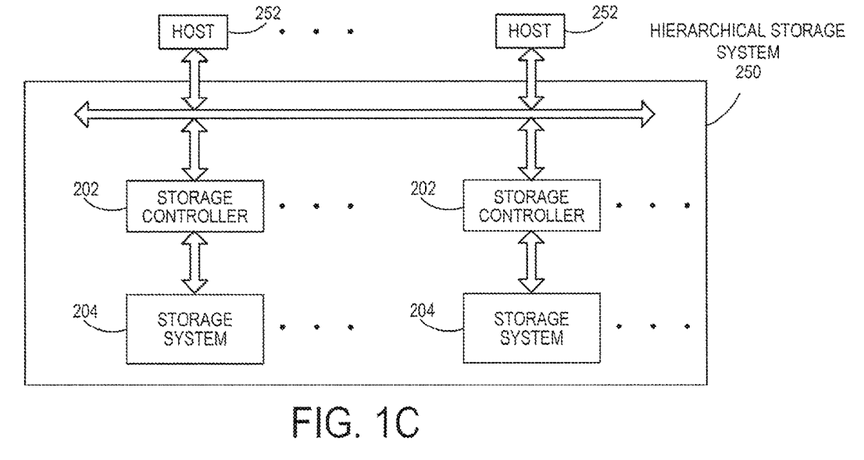
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
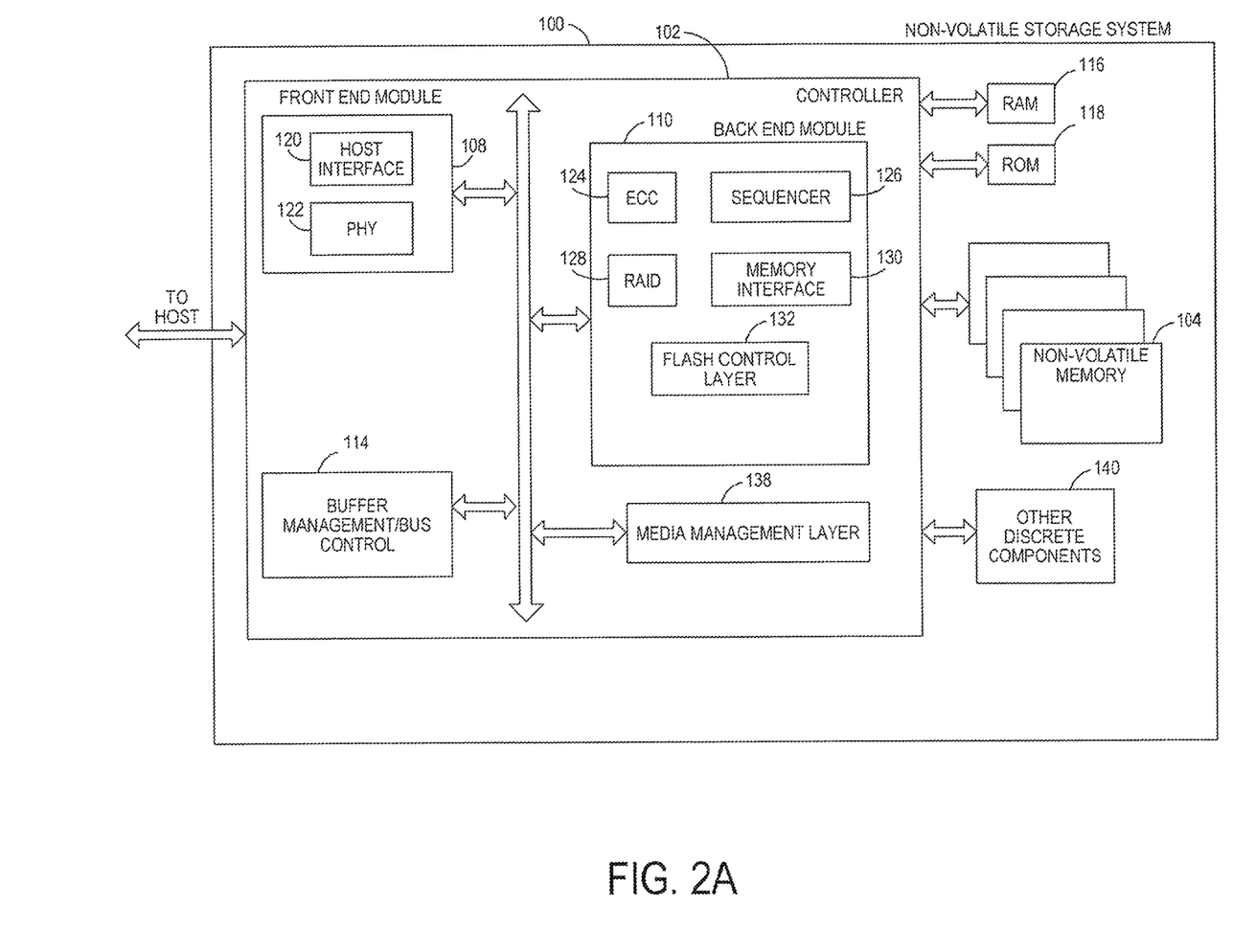
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
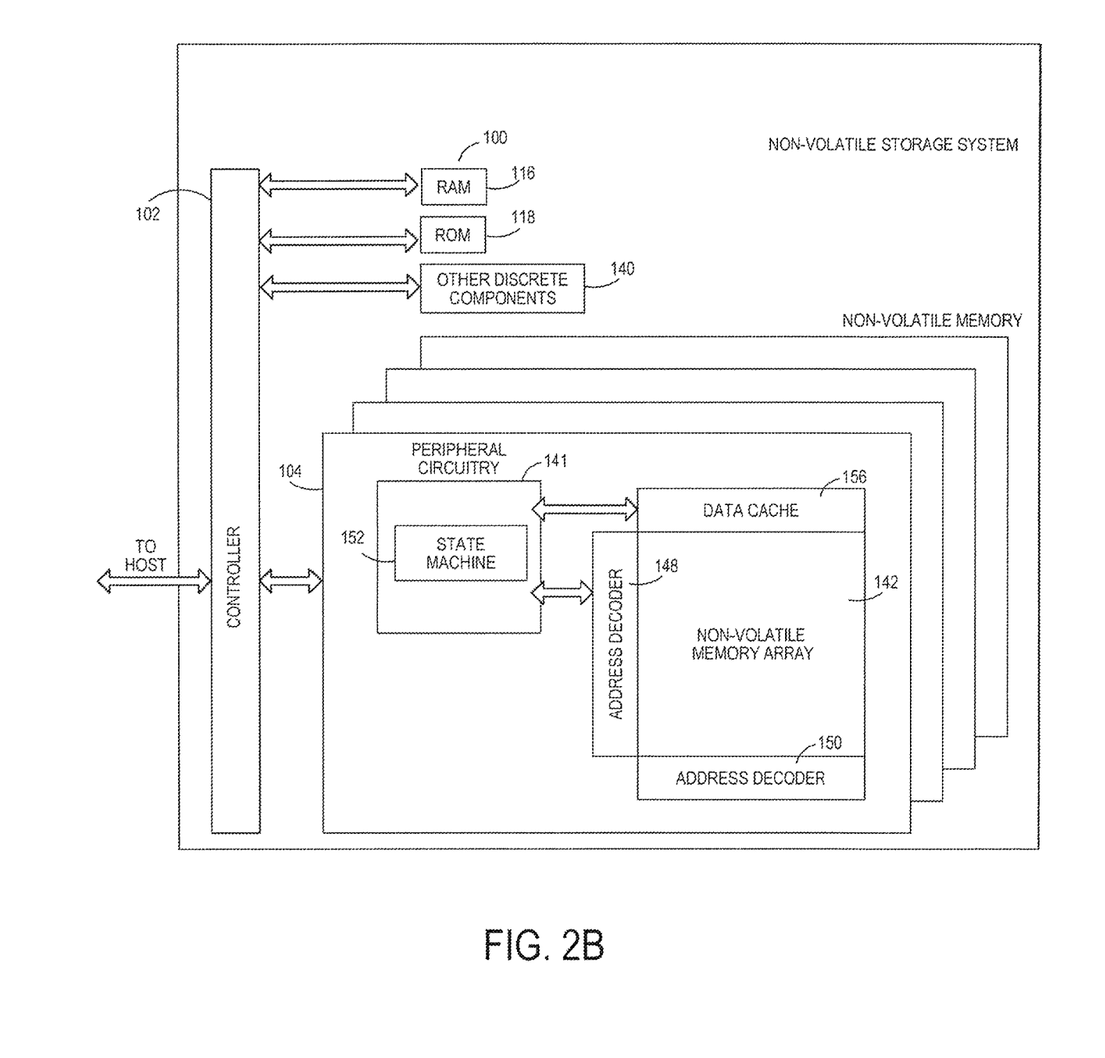
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
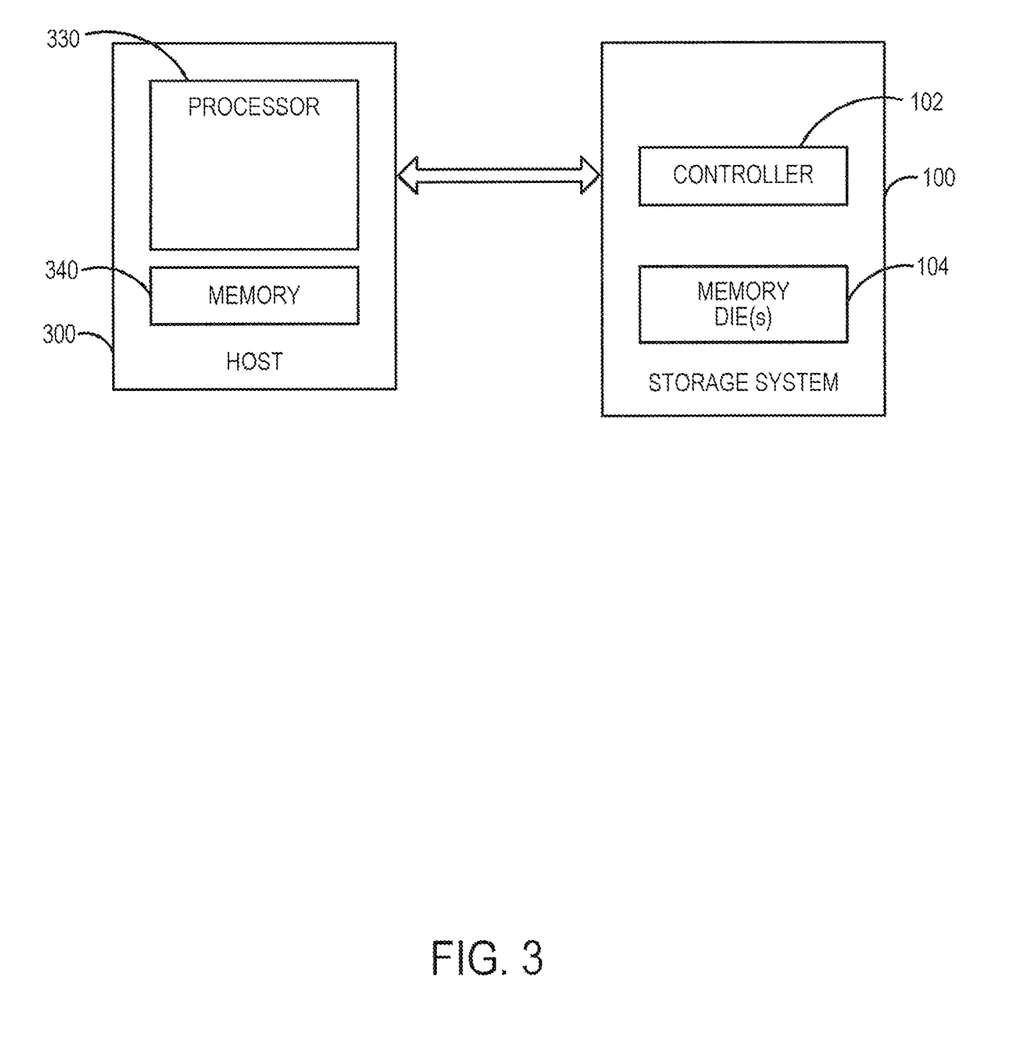
FIG. 3 is a block diagram of a host and storage system of an embodiment.

Turning again to the drawings, FIG. 3 is a block diagram of a host 300 and storage system 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises a processor 330 and a memory 340. In one embodiment, computer-readable program code stored in the host memory 340 configures the host processor 330 to playback media read from the memory 104 of the storage system 100.

As mentioned above, the storage system 100 can be used to store video data captured by an image capture device (e.g., camera). The image capture device can be separate from or integrated in the host 300. Such an arrangement can be used in a surveillance environment. Because video is typically taken over a long period of time in a surveillance environment (e.g., overnight, over the course of several days or weeks, etc.), there may be limitations on how much video data can be stored in the memory 104 of the storage system 100. More data can be stored if a lower encoding bit rate is used. However, this comes at the cost of video quality. Thus, there is a tradeoff between storage management and quality of service (QoS). Namely, using a higher bit rate to encode a stationary background will lead to poor storage management, but using a lower bit rate to encode a fast-paced situation will lead to poor quality of service, which can be a problem in surveillance systems.

Some surveillance systems use machine learning techniques to determine the required bit rate ahead of time to balance the encoding bit rate conditions. Variable bit rate (VBR) schemes can be used to determine differences in the overall content of video frames and adjust the bit rate accordingly. That is, the encoder in the video capture unit at the capture point dynamically determines the bit rate based on the current capture compared to the previous capture. However, because these schemes look at the overall content of the video frames, such schemes may not account for a particular object that would be of interest to a person later reviewing the surveillance video data. For example, a fast-moving or relatively small object may not contain enough of a change to the overall video frame to trigger a variable bit rate change. The same goes for an incomplete capture of an object. The following embodiments provide a bit rate control method that can address these issues, thereby optimizing storage as well as network bandwidth.

In general, some of the following embodiments provide a method for performing object and rate detection to determine the optimum variation level in the bit rate. An optimum variation level can provide a long-term advantage, especially with ultra-high definition video in video surveillance systems, such as 12 megapixel (MP) and 8 MP devices, where the same level of quality can be maintained for a carefully-chosen bit rate. Specifically, these embodiments can enable a tradeoff between optimum storage for increased compute power and quality of service.

Another advantage of these embodiments is that they can fine-tune the bit rate consistent with the object rate, thereby maintaining a steady video quality, which is not easily possible with conventional variable bit rate techniques. As mentioned below, object detection and rate-of-movement determination can be performed in the storage system 100, in the host 300, or in another computer or application processor attached to the encoder/capture point. However, it may be desired to perform those acts in the storage system 100 since machine leaning models can involve repetitive and predictable operations on data. It should be noted that any suitable machine leaning model can be used, such as, but not limited to, a region convolutional neural network (R-CNN) and a spatial pyramid pooling network (SPP-net).

Also, while these embodiments have advantages in the surveillance system context, they also provide advantages in other contexts. For example, these embodiments can be used in autonomous vehicles, which are sensor driven. The rate detection may not only optimize the storage but may also be an input parameter to other controlling sensors, alongside conventionally-available Lidar and radar systems. For example, these embodiments may allow building a clear path from point X to point Y, sending appropriate instructions to the controls of the car, such as steering, acceleration, and braking.

Figure 4:
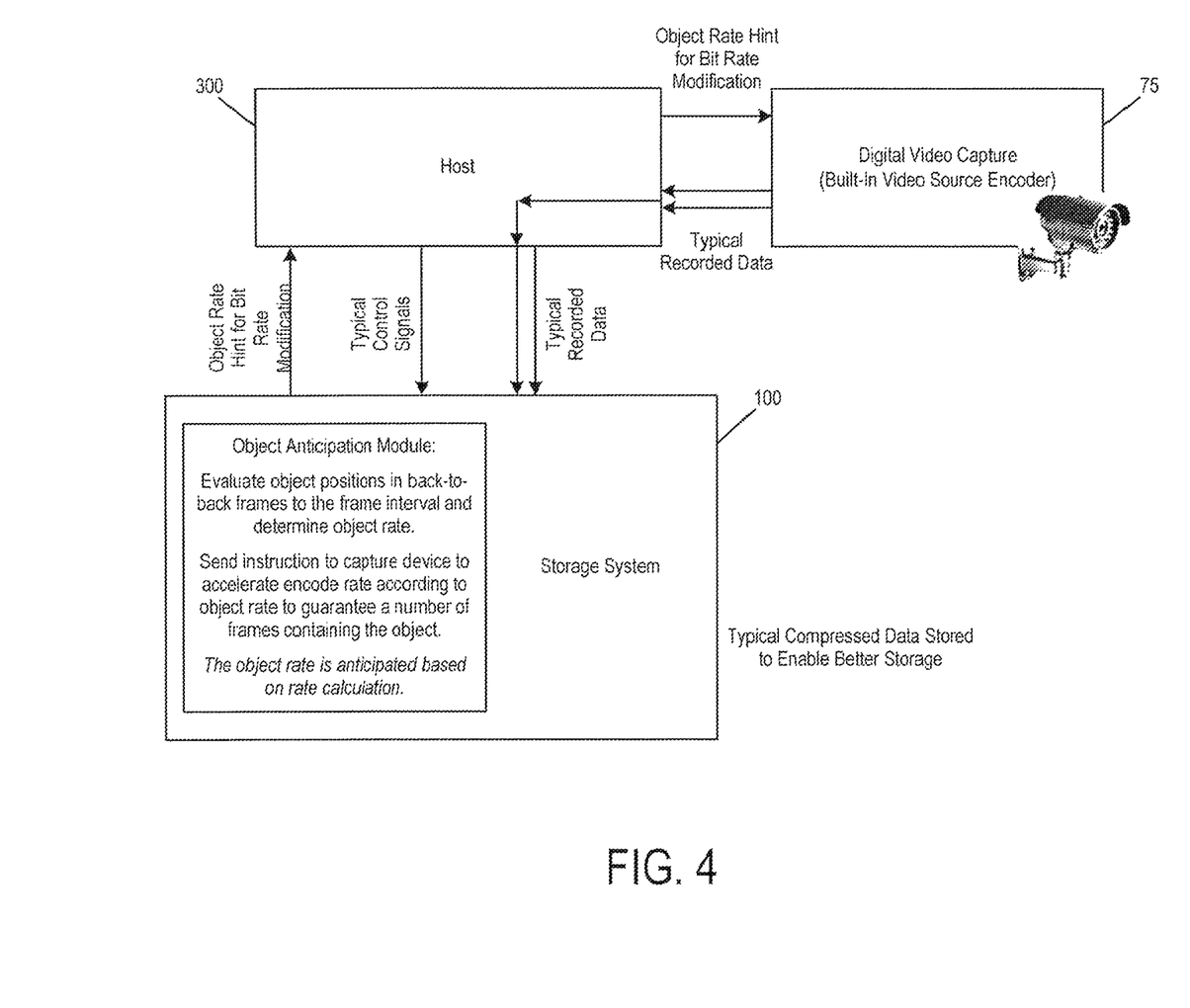
FIG. 4 is a block diagram illustrating an object anticipation method of an embodiment.

Returning to the drawings, FIG. 4 is a block diagram that illustrates one example embodiment. As shown in FIG. 4, in this example, a digital video capture unit 75 with a built-in video source encoder is in communication with a host 300, which is in communication with the storage system 100. While the host 300 and digital video capture unit 75 are shown as different entities in FIG. 4, it should be understood that the digital video capture unit 75 can be part of the host 300.

In this embodiment, the video data is send to the storage system 100 for storage via the host 300 as the video is being recorded. Instead of just storing the data in the memory 104 of the storage system 100, the controller 102 in the storage system 100 decodes the video data, identifies an object (e.g., a human, animal, vehicle, (these are just examples) or anything that can affect changes to the encoded video frames) in a video frame (e.g., using machine learning), and then identifies positions of an object in one or more subsequent video frames. With this position information, the controller 102 determines a rate of movement of the object. Based on the determined rate of movement of the object, the controller 102 provides a suggestion to the video capture device 75 to dynamically modify an encoding bit rate of the video data to improve video quality of the object.

In one implementation, the object is identified at the beginning of the capture zone (i.e., its first appearance in a video frame), and the movement of the object is tracked quickly (e.g., during the first two video frames containing the object). By acting early, the controller 102 can suggest changes to the encoding bit rate early enough to improve the quality of the captured video of the object for the rest of the time that the object is in the capture zone. That is, by determining a suggested encoding bit rate ahead of time when the object is noticed in the initial frames of capture, storage efficiency and quality of service of the video is improved as fast as possible. Based on the subsequent rate of change of the object, the encode bit rate can be tweaked.

By using object motion to dynamically fine-tune the encoding bit rate ahead of time, this embodiment can improve the capture quality of service of the object. As mentioned above, because prior variable bit rate techniques analyze changes in the entire video frame and not movement of a specific object in the video frame, these embodiments provide advantages over those prior techniques.

As an example use case of this embodiment, consider the situation in which a car is captured and detected in one of the frames. The car's movement rate is evaluated from the subsequent frames, and the number of frames that would capture the car until the car exits the capture zone can be determined. If the rate is determined at the beginning of the capture zone, then the slope of the increased frames per second (FPS) can be bumped up, making sure the object is sampled in more frames. On the other hand, if the encoding system of capture is not sensitive (e.g., if the slope of the increased frames per second (FPS) is not good), there may only be a very few frames containing the car before the car leaves the capture zone. So, there may not be enough frames to provide an improved quality of service (e.g., the license plate number of the car may not be clearly visible due to the car's speed). By acting early, a certain number of frames containing the object at improved clarity can be achieved.

In another perspective of the same example, consider the situation in which the car takes two seconds to cross a surveillance capture zone, and there are only two high-quality intraframes (I frames) (i.e., a frame of digital content that is independent of frames that precede and follow it) involving the car. Assume a default 15 frames per second (FPS) and 15 frames in a group of pictures (GOP). If the car is detected at the beginning of the zone, and FPS can be quickly increased based on that, say to 60 FPS, and there can be at least three or four I frames involving car.

In another embodiment, the controller 102 can also identify the type of object (e.g., a human, an animal, or a vehicle) being tracked (e.g., using machine learning) and provide a suggestion to the video capture device 75 to dynamically modify the encoding bit rate of the video data based on the type of the object. This provides an "object type" based quality of service improvement in the storage system 100. This embodiment is illustrated in FIG. 5.

Figure 5:
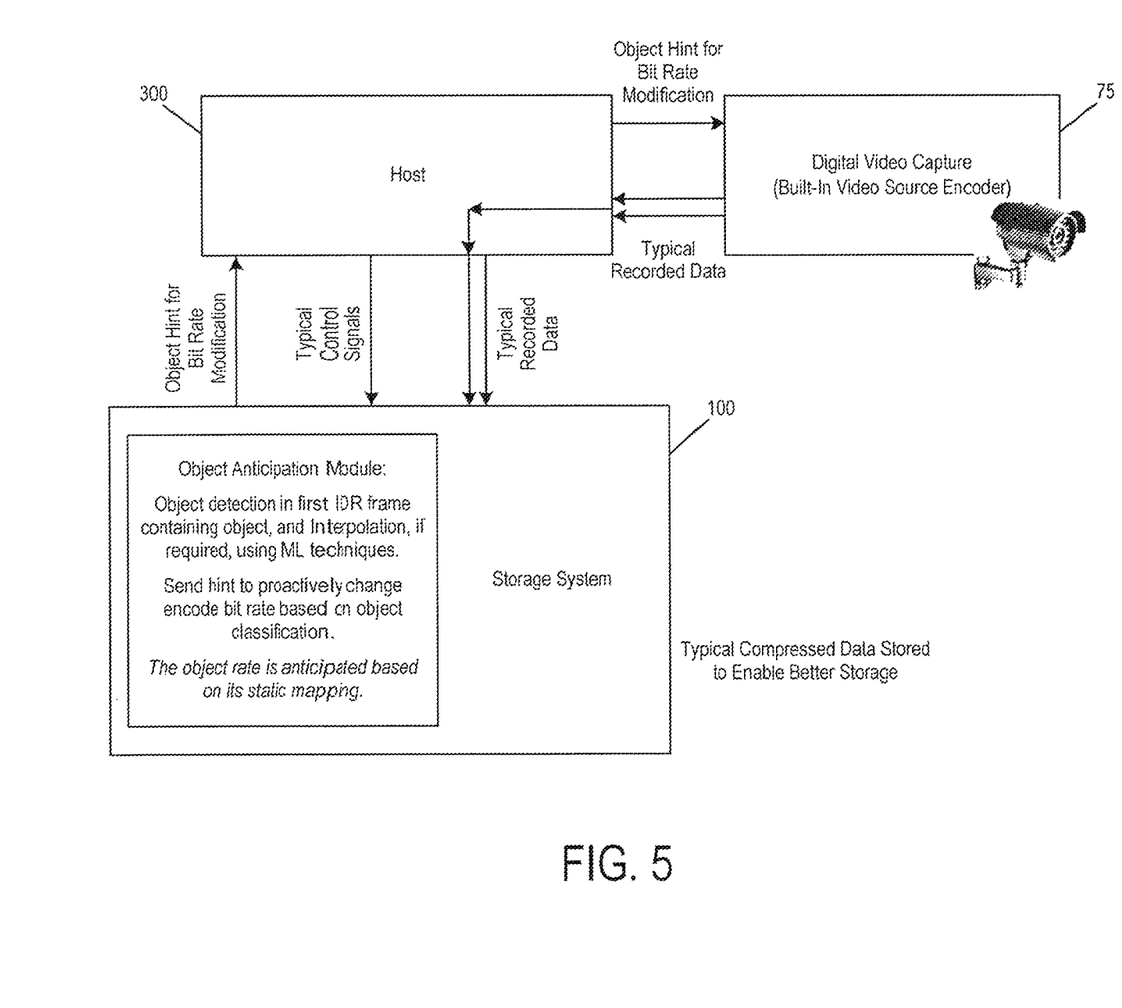
FIG. 5 is a block diagram illustrating an object anticipation method of another embodiment.

As shown in FIG. 5, in this embodiment, the controller 102 in the storage system 100 detects an object in a frame of video data provided by the video capture device 75, performs interpolation on the detected object to determine a type of the object; and provides a suggestion to the video capture device 75 to dynamically modify an encoding bit rate of the video data based on the type of the object. In one embodiment, the object is detected (e.g., using machine learning) in a first instantaneous decoder refresh (IDR) frame.

With this embodiment, if the controller 102 detects part of an object, the controller 102 performs an interpolation to establish the actual object and provides a hint to the capture device 75 to modify its encoding bit rate dynamically based on the statically-estimated speed of those interpolated objects. This embodiment can be used to tweak capture and storage through a static mapping basis. The hint created out of evaluating the object can be passed to the encoding system to better tune the capture sensitivity based on the object classification, rather than the absolute object rate as in the embodiment above. In situations where the machine learning model does not have clean object detection, the fall back mechanism of a safer hint towards a better encoding rate can be used.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   an interface configured to communicate with a computer system;
   a memory; and
   a controller in communication with the interface and the memory, wherein the controller is configured to:
   identify positions of an object in a plurality of frames of video data provided by a video capture device in communication with the computer system;
   determine a rate of movement of the object based on the identified positions;

based on the determined rate of movement of the object and an encoding bit rate of the video data, determine a number of frames that will contain the object before the object leaves a capture zone; and in response to determining that the number of frames that will contain the object before the object leaves the capture zone is below a threshold, provide a suggestion to the video capture device to dynamically increase the encoding bit rate of the video data to increase the number of frames that will contain the object before the object leaves the capture zone to meet the threshold.

2. The storage system of claim 1, wherein the controller is further configured to identify positions of the object at a beginning of a capture zone.

3. The storage system of claim 1, wherein the controller is further configured to identify positions of the object during a first two frames that the object appears in the video data.

4. The storage system of claim 1, wherein the controller is further configured to identify the object using machine learning.

5. The storage system of claim 1, wherein the controller is further configured to identify a type of the object.

6. The storage system of claim 5, wherein the controller is further configured to identify the type of the object using machine learning.

7. The storage system of claim 5, wherein the type of the object comprises one of the following: a human, an animal, and a vehicle.

8. The storage system of claim 5, wherein the controller is further configured to provide a suggestion to the video capture device to dynamically increase the encoding bit rate of the video data based on the type of the object.

9. The storage system of claim 1, wherein the memory comprises a three-dimensional memory.

10. The storage system of claim 1, wherein the controller is further configured to restore the encoding bit rate to its original value after the object leaves the capture zone.

11. The storage system of claim 1, wherein the number of frames is increased to a predetermined number.

12. The storage system of claim 1, wherein the number of frames is increased to meet a quality of service requirement.

13. The storage system of claim 1, wherein controller is further configured to determine the rate of movement and provide the suggestion as the video data is being received.

14. The storage system of claim 1, wherein controller is further configured to determine the rate of movement and provide the suggestion prior to the video data being stored in the memory.

15. The storage system of claim 1, wherein the controller is further configured to:
identify an object type of the object; and
provide a suggestion to the video capture device to further modify the encoding bit rate of the video data based on the object type.

16. A method comprising:
performing the following in a storage system comprising a memory:
detecting a part of an object in a frame of video data provided by a video capture device, wherein the part of the object is detected in a first instantaneous decoder refresh (IDR) frame using machine learning;
performing interpolation on the detected part of the object to determine a type of the object;
determining a statically-estimated speed of the object based on its determined type;
based on the statically-estimated speed of the object and an encoding bit rate of the video data, determining a number of frames that will contain the object before the object leaves a capture zone; and
in response to determining that the number of frames that will contain the object before the object leaves the capture zone is below a threshold, providing a suggestion to the video capture device to increase the encoding bit rate to increase the number of frames to meet the threshold.

17. The method of claim 16, wherein the type of the object comprises one of the following: a human, an animal, and a vehicle.

18. A device comprising:
means for identifying positions of an object in a plurality of frames of video data provided by a video capture device in communication with a computer system;
means for determining a rate of movement of the object based on the identified positions;
means for determining a number of frames that will contain the object before the object leaves a capture zone based on the determined rate of movement of the object and an encoding bit rate of the video data; and
means for providing a suggestion to the video capture device to dynamically increase the encoding bit rate of the video data to increase the number of frames that will contain the object before the object leaves the capture zone to meet the threshold, in response to determining that the number of frames that will contain the object before the object leaves the capture zone is below a threshold.

* * * * *